United States Patent [19]

Farr

[11] Patent Number: 5,125,789
[45] Date of Patent: Jun. 30, 1992

[54] MOLDED PARTS REMOVAL AND TRANSFER ROBOT

[75] Inventor: Stephen W. Farr, Somonauk, Ill.

[73] Assignee: Peerless Automation, Bridgeview, Ill.

[21] Appl. No.: 459,956

[22] Filed: Jan. 2, 1990

[51] Int. Cl.$^5$ ............................................. B25J 18/04
[52] U.S. Cl. ..................................... 414/728; 414/751;
74/110; 74/479; 901/17; 901/22; 901/25
[58] Field of Search ......................... 414/749, 751–753,
414/89.21, 750, 728, 718, 729, 680; 901/9, 13,
17, 18, 22, 25, 35, 37; 74/110, 479, 89.11;
52/118; 212/187, 230, 231, 264

[56] References Cited

U.S. PATENT DOCUMENTS

| | | |
|---|---|---|
| 1,579,975 | 6/1926 | Tunison . |
| 2,353,716 | 7/1944 | Estey et al. . |
| 3,212,649 | 10/1965 | Johnson et al. . |
| 3,429,195 | 2/1969 | Bassoff . |
| 3,550,630 | 12/1970 | Panissidi . |
| 3,575,301 | 4/1971 | Panissidi . |
| 3,648,854 | 3/1972 | Potter . |
| 3,665,771 | 5/1972 | Blatt . |
| 3,731,821 | 5/1973 | Wallis . |
| 3,893,378 | 7/1975 | Hewitt . |
| 3,895,729 | 7/1975 | Dukette . |
| 3,896,681 | 7/1975 | Boyle ................................ 901/22 X |
| 3,951,002 | 4/1976 | Gilardi . |
| 4,164,893 | 8/1979 | Granbom et al. . |
| 4,274,329 | 6/1981 | Weyer . |
| 4,319,864 | 3/1982 | Kaufeldt ........................ 414/751 X |
| 4,379,335 | 4/1983 | Kirsch et al. ..................... 901/17 X |
| 4,489,624 | 12/1984 | Schaib et al. ..................... 901/22 X |
| 4,495,828 | 1/1985 | Iwamoto ............................... 74/110 |
| 4,571,149 | 2/1986 | Soroka et al. .................... 901/16 X |
| 4,575,956 | 3/1986 | McDermott et al. ................ 52/118 |
| 4,648,782 | 3/1987 | Kraft . |
| 4,717,310 | 1/1988 | Heindel et al. . |
| 4,724,744 | 2/1988 | Rosengren . |

FOREIGN PATENT DOCUMENTS 1098522 5/1986 Japan ................................. 901/17

OTHER PUBLICATIONS

Peerless Automation Brochure "The Mach V Robot" (four pages).

Primary Examiner—Robert J. Spar
Assistant Examiner—Donald W. Underwood
Attorney, Agent, or Firm—Hill, Van Santen, Steadman & Simpson

[57] ABSTRACT

A transfer robot for removing molded pieces provides a telescoping robot arm having a pneumatically activated gripping device mounted to a remote end. The robot arm comprises two tubes mounted coaxially inside a housing. The first tube is driven outwardly of the housing by a rodless cylinder drive; the second tube is mounted coaxially to the inside of the first tube and is itself driven by a rack and pinion arrangement which doubles the projecting speed of the second tube with respect to the projecting speed of the first tube. The robot arm is movably mounted to a cantilever rack which is itself rotatably mounted to a supporting stand. Thus the gripping assembly to the robot arm can be translated along the axis of the robot arm by the telescoping action of the robot arm, can be laterally translated by the lateral movement of the entire robot arm with respect to the cantilever rack, and can be translated to the side by rotating the cantilever rack with respect to the support stand, which causes rotation of the entire robot arm. The invention further comprises a plurality of position sensors feeding information into a controller which provides instruction to a plurality of solenoid valves which regulate pneumatic air to the various actuators and cylinders to control all movements of the transfer robot.

28 Claims, 3 Drawing Sheets

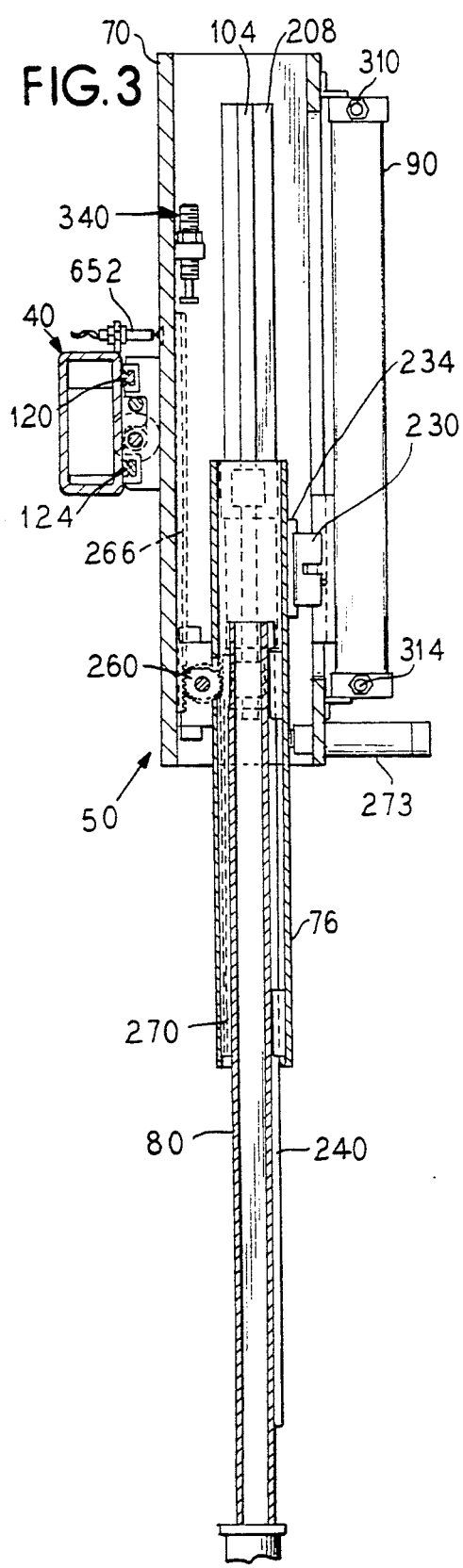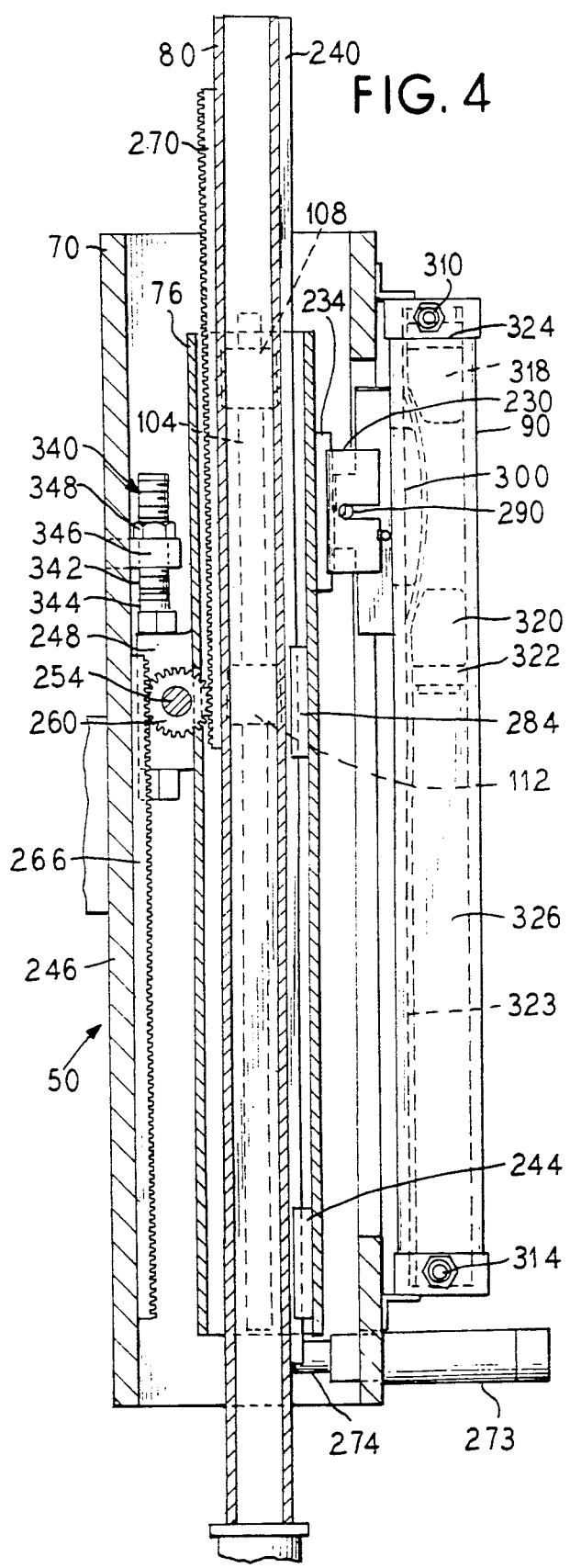

MOLDED PARTS REMOVAL AND TRANSFER ROBOT

BACKGROUND OF THE INVENTION

This invention relates to a device for handling objects and, more particularly, to a machine for engaging an object within an operational range of the machine and for delivering the engaged object to a predetermined location. More particularly, this invention relates to a transfer robot for removing a piece from an opened injection mold and depositing the piece at a proximate location such as onto a conveyor.

There are patented machines which address industry's need for a versatile apparatus which can be programmed to manipulate a workpiece. Such a machine is disclosed in U.S. Pat. No. 3,212,649. This machine requires a complex geared rotating vertical shaft coupled to a rack and pinion system to impart lateral displacement of the workpiece gripping assembly. The machine also utilizes a double rack and pinion system for doubling vertical rate of displacement of the gripping assembly, however, the double rack and pinion arrangement is only effective in a vertical direction. The machine requires a plurality of gearing engagements which cause the machine to be more complex, and more difficult to manufacture, maintain and repair, than the present invention.

U.S. Pat. No. 3,575,301 discloses a manipulator which comprises a complex machine requiring a wrapped endless drive cable and does not utilize the double rack and pinion arrangement of the present invention.

U.S. Pat. No. 3,895,729 discloses a sensor responsive cybernetics machine which can manipulate a workpiece in three directionally axis by using electric motors driving either screw mechanisms or rack mechanisms. The machine does not disclose a double rack and pinion system for doubling translation speed of the gripping means or for minimizing overhead clearance for backstroke of the robot arm.

It is therefore new to the art to provide a transfer robot for manipulating a workpiece which utilizes a double rack and pinion arrangement to multiply robot arm extension speed; which provides for utilizing the double rack and pinion arrangement in a variety of directional axis and not just vertically; which utilizes an externally mounted rodless cylinder drive arrangement for ease of maintenance; which utilizes rugged pneumatic actuators for importing lateral and rotational movements in leu of more complex gearing arrangements; and which utilizes a plurality of location sensors and an electronic controller to program and coordinate the robot arm movements.

SUMMARY OF THE INVENTION

The present invention provides a transfer robot for manipulating, transferring, loading or unloading a workpiece. More particularly, the present invention relates to removing and transferring a molded piece from an opened injection mold.

Objects of the present invention are:
to provide a rugged robot arm assembly providing great flexibility of spacially positioning a gripper for manipulating a workpiece;
to provide a configuration of the robot arm which minimizes required backstroke clearance;
to provide a robot arm which can extend or retract along an axis, the axis orientation ranging at least 90°, from vertical to horizontal;
to provide displacement actuators for lateral axial, and rotational movements, which are simple in construction, economical to manufacture, maintain or replace;
to provide for a smoothly operating machine which require minimal adjustment or alignment;
to provide a machine sufficiently equipped with sensors and controls to precisely accommodate a variety of tasks.

The stated objects are inventively achieved in that:
the robot arm comprises a rugged outer housing wherein is slidably mounted co-axial tubes forming a telescopic arrangement for reaching for the workpiece;
the robot arm utilizes a double rack and pinion arrangement which minimizes the required overhead or backstroke clearance because of the telescoping tube arrangement;
the double rack and pinion arrangement provides for a rapid extension and retraction of the telescoping robot arm, doubling an overall extension rate as compared to a linear movement of a pneumatic means of translating the robot arm;
the double rack and pinion arrangement comprises a first rack secured to the housing on an inside surface in a lengthwise orientation facing a first tube, a second rack mounted to an outside surface of a second tube in a lengthwise orientation and facing the first rack, the second tube residing coaxially inside the first tube, and a pinion mounted for rotation to a chassis fixed to the first tube, the pinion engaging the first and second racks, movement of the first tube causing the pinion to roll along the first rack and drive the second rack and second tube at a speed double the speed of the first tube, both with respect to the housing;
the robot arm is slidingly mounted to a horizontal cantilever rack which is rotatably mounted about its longitudinal axis to a vertical stand, thus providing a wide variety of spacial positions of a gripping assembly mounted to a remote end of the robot arm;
the robot arm is extended along its axis in a telescopic manner by movement imparted from a rodless cylinder drive mounted to the housing with travel direction having a parallel orientation with the axis of the robot arm;
the cantilever rack is caused to rotate about its longitudinal axis by a rotation pneumatic actuator mounted at one end to the stand, and at another end to a lever arm offset from the longitudinal axis of the cantilever rack;
the robot arm is laterally translated along the axis of the cantilever rack by a translation pneumatic actuator;
the rodless cylinder drive and the pneumatic actuators, mounted externally to the housing, provide for easily replaceable components, providing for an economically manufactured and maintained machine;
the rodless cylinder drive and the pneumatic actuators eliminate gearing and other expensive and complex means of robot arm movement of the prior art;
the cantilever rack, being rotatably mounted about the longitudinal axis to the stand, provides for the robot arm to extend telescopically not only in a vertical orientation but in an infinite number of angular positions ranging from vertical to horizontal, or a greater range depending on job requirements;

position sensors mounted on the cantilever rack, on the robot arm housing, and on the rotation pneumatic actuator provide a multitude of inputs for complex control and coordination of the robot arm movements;

an electronic controller, reading information from the multitude of sensors, outputs signals to a plurality of solenoid valves which communicate selected pneumatic impetus to the rodless cylinder drive, and the pneumatic actuators;

the housing provides position sensors adjacent to a sensor rod mounted to a travel member of the rodless cylinder drive such that the instantaneous position of the rodless cylinder drive can be communicated to the electronic controller, such information can be used by the electronic controller to control appropriate pneumatic air solenoid valves, by communicating to the rodless cylinder drive to control the speed of the travel member relative to its position;

the rotation pneumatic actuator provides two sensors which communicate rotation position to the electronic controller, such information can be used to control pneumatic input to the rotation pneumatic actuator to select the rotational position of the cantilever rack, and thus the robot arm;

the cantilever rack provides sensors to communicate lateral position of the robot arm assembly with respect to the cantilever rack, such information communicated to the electronic controller can be used to send a pneumatic input to the translation pneumatic actuator for changing the lateral position of the robot arm assembly;

the gripping assembly provides a clamp for engaging the workpiece, the clamp providing a pneumatically actuated means to grip the piece, and providing a sensor to communicate the presence or absence of a workpiece in the clamp to the electronic controller;

the gripping assembly provides a rotation joint having two pneumatic ports, pneumatic air introduced into one port instigates clockwise rotation of the clamp, pneumatic input into the other port instigates counter-clockwise rotation of the clamp;

the first tube is mounted for sliding movement inside the housing by two linear motion bearings, comprising two rails, one mounted on each of two opposite inside surfaces of the housing and each facing the first tube, and four carriage members slidably engagable to the two rails and fixidely attached to the first tube, the second tube slideably mounted to the first tube using a similar arrangement with a third linear motion bearing having a third rail mounted axially to an outside of the second tube, and two carriages mounted to an inside surface of the first tube and slidably engagable to the third rail;

the linear motion bearing arrangements provide a smooth sliding arrangement of the first and second tubes with minimal side play, the arrangement of the first and second linear motion bearings on opposite sides of the first tube thus capturing the first tube tightly between the two linear motion bearings, provides for little lateral play of the first tube with respect to the housing, and the location of the third linear motion bearing opposite the second rack captures the second tube between the third linear motion bearing and the pinion providing minimal lateral play between the second tube and the first tube, thus the sliding arrangement provide for a smooth vibration and rattle free operation;

the rodless cylinder drive, linear motion bearings, and the pneumatic actuators are all commercially available components providing for a easily manufactured maintained and repaired assembly; and the stand provides structural support for the transfer robot and also provides a framework whereon is mounted the pneumatic solenoid valves for a compact arrangement.

BRIEF DESCRIPTION OF THE DRAWINGS

FIG. 3 is a sectional view generally along line III—III of FIG. 1 showing the transfer robot in a fully extended condition;

FIG. 4 is an enlarged sectional view of the transfer robot in a fully retracted condition;

DESCRIPTION OF THE PREFERRED EMBODIMENTS

Figure 1:
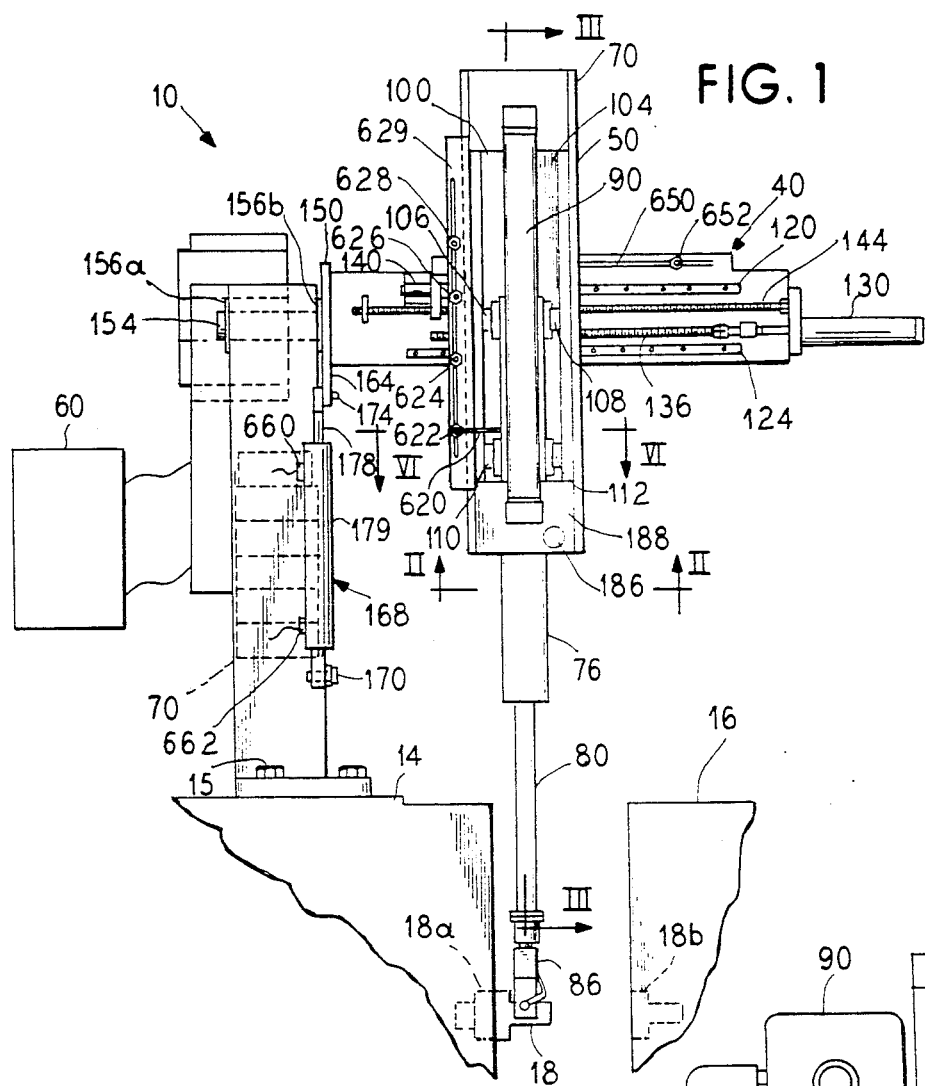
FIG. 1 is a front elevational view of a transfer robot mounted to an injection mold.

FIG. 1 shows a transfer robot generally at 10 mounted to a first mold half 14 such as by bolts 15. A second mold half 16 is shown separated from the first mold half 14, an injection mold operation having been completed, the transfer robot being in the position to remove the molded piece or workpiece 18, the molded piece 18 having been molded by complimentary volumes 18a-18b.

The transfer robot 10 comprises a stand 20 providing structural support, a cantilever rack 40 providing support as well as translational and rotational maneuverability, and a robot arm assembly 50, for manipulation of the piece 18. A controller 60 receives various displacement signals and respond with pneumatic outputs as described below.

The robot arm assembly 50 comprises a housing 70, a U-shaped member. Slidably mounted within the housing 70, generally coaxially, is a first tube 76. Slidably mounted, generally coaxially, within the first tube 76 is a second tube 80. At a remote end of second tube 80 is a gripping assembly 86 for manipulating the piece 18. The housing 70, the first tube 76, and the second tube 80 are thus mounted in a telescoping fashion, extending from the cantilever rack 40 to the gripping assembly 86.

The first tube 76 is slidably mounted inside the housing 70 by linear motion rails 100, 104. Such linear motion rails permit the first tube 76 to translate axially only with respect to the housing 70. The second tube 80 is mounted inside first tube 76 in a similar fashion using a third linear motion rail 240 shown in FIG. 2.

A rodless cylinder drive 90 is mounted to a front of the transfer robot arm assembly 50. The rodless cylinder drive 90 is aligned for movement generally parallel with the direction of axial movement of the first tube 76.

The first tube 76 is movably mounted to the linear motion rails 100, 104 by four carriages 106, 108, 110, 112, attached to the first tube 76 in an appropriate grid for sturdy translation of the first tube 76 within the housing 70. The linear motion rails 100, 104 are arranged generally axially with the housing 70.

The cantilever rack 40 provides lateral linear motion rails 120, 124. The housing 70 provides, mounted on a backside appropriate carriages which translate along the lateral linear motion rails 120, 124 (not shown). The linear motion rails 120, 124 permit the robot arm assembly 50 to translate toward and away from the stand 20 in a lateral direction. A first pneumatic actuator 130, driving an adjustable rod 136 which is attached to the housing 70, causes the housing 70 to translate along the linear rails 120, 124. A lateral stop 140 sets a minimum approach distance between the robot arm assembly 50 and the stand 20. The lateral stop 140 adjustably mounts to stop rod 144.

At a near end of the cantilever rack 40 is a flange 150. The flange 150 is secured to a shaft 154 which rotatably secures the cantilever rack 40 to the stand 20. The shaft 154 rotates inside appropriate journals 156a and 156b. The flange 150 further provides an offset portion 164 which is connected to a rotation actuator 168 at a pivot connection 174. The rotation actuator 168 is connected to the stand 20 at a second pivot connection 170. By pneumatic means the actuator 168 increases or decreases in length by extending or retracting push rod 178 from or into the cylinder 179. The push rod 178 being eccentrically connected to the flange 150 at the offset portion 164, causes rotation of the flange 150 about the shaft 154 which in turn causes rotation of the cantilever rack 40 about its longitudinal axis, and thusly rotation of the robot arm assembly. The rotation actuator 168 and the offset portion 164 can be configured to accomplish a wide range of arcs, however in the preferred embodiment a 90° range is typical.

Figure 2:
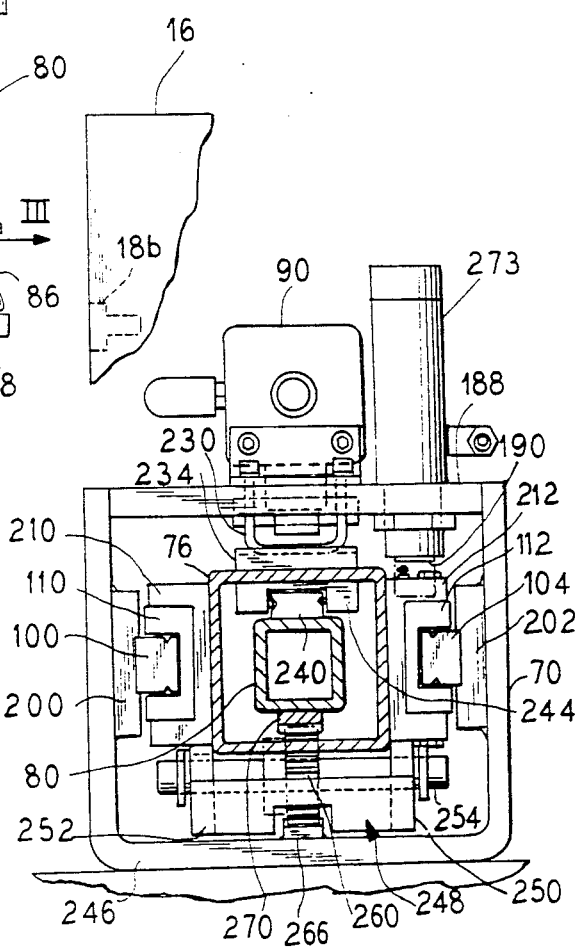
FIG. 2 is a sectional view generally along II—II of FIG. 1.

FIG. 2 shows the first tube comprising a square cross section slidably mounted to the housing 70. Carriage 110 engages linear motion rail 100 on one side of the first tube 76, and carriage 112 engages linear motion rail 104 on an opposite side of the first tube 76. Linear motion rails 100, 104 are themselves attached to the housing 70 by securing to adaptor plates 200, 202 such as by screwing (not shown). Adaptor plates 200, 202 can be welded to the housing 70. Carriages 110, 112 are secured to the first tube 76 by attachment to connection pieces 210, 212 which are themselves welded to the first tube 76. Similar connection pieces (not shown) are used to secure carriages 106, 108 to the first tube 76. Connection of the carriages 110, 112, 106 and 108 to the connection pieces can be by mechanical means such as by screws. The rodless cylinder drive 90 is shown mounted to the front side of the housing 70 at a front wall 188. The rodless cylinder drive 90 mounts to a drive frame 230 which mounts to an attachment plate 234 which is itself fixed to the first tube 76. The drive frame 230 can be connected to the attachment plate 234 by mechanical means such as by screws while the attachment plate 234 can be welded to the first tube 76.

The second tube 80 is shown as also being rectangular in cross section and also shown slidably mounted within the first tube 76. The second tube 80 provides a third linear motion rail 240 fixed to the second tube 80 in an axial orientation. The first tube 76 provides a fifth carriage 244, and a sixth carriage 284 (shown in FIG. 3,4) which slidably engage the third linear motion rail 240, allowing the second tube 80 to move axially only with respect to the first tube 76. Attached to a back wall 246 of the housing 70 is a first rack 266, arranged axially to the first tube 76. Mounted to the first tube 76 on a side nearest the first rack 266, is a chassis 248. The chassis 248 provides two end plates 250, 252 oriented perpendicular to the back wall 246 and parallel to the direction of movement of the first tube 76. The plates 250, 252 hold an axle 254 (shown in more detail in FIG. 6). The axle 254 holds a pinion 260 thereon fixed for rotation with the axle 254. A second rack 270 is attached to the second tube 80, aligned parallel with the axis of the second tube 80 and the first rack 266, and located between the second tube 80 and the first tube 76. The pinion 260 engages the first rack 266 and the second rack 270, engaging the second rack 270 through a window 272 in the first tube 76 (shown in FIG. 6).

The linear motion rails 100, 104, 120, 124, 240 and corresponding carriages 106, 108, 110, 112, 244, 284 used for the first tube, the second tube, and the cantilever rack can be bought commercially comprising both the linear motion rail and the corresponding carriages as a unit, referred to as linear motion bearings. Such linear motion bearings permit only axial movement of the carriages along the linear motion rail, and the carriages utilizes ball bearings therein for smooth sliding movement. The carriages are effectively captured onto the linear motion rails, limited to axial sliding thereon.

A lockout piston 273 is mounted to the front wall 188 of the housing 70, the lockout piston 273 holding the robot arm in a fully retracted position until deactivated, further described in FIG. 3 and FIG. 4.

FIG. 3 shows the robot arm assembly in a fully extended position. The first tube 76 is extended remote from the housing 70 until the rodless piston drive 90 has reached maximum travel. The drive frame 230 thusly prohibits any further travel of the first tube 76, the pinion 260 is therefore prohibited from rotating since it is engaged to the first rack 266 and translationally affixed to a first tube 76, i.e. the pinion 260 can not longer roll along the first rack 266. Thus, by being both fixed to rotation and translation, the pinion engaged to the second rack 270 prohibits further linear movement of the second tube 80 with respect to the first tube 76.

FIG. 4 shows the robot arm assembly 50 in a fully retracted position. The lockout piston 273 has been activated to extend a knob 274 in a direction inwardly of the housing 70, and located abutting a remote end of the first tube 76. Thus the knob 274 prevents extension movement of the first tube 76, which in turn prevents rotation of the pinion 260, which therefore also locks the second tube 80 from movement with respect to the first tube 76. The rodless cylinder drive 90 is shown in more detail. A travel member 300 moves axially along a length of the rodless cylinder drive 90, being driven by selected pneumatic air pressure introduced into an air port 310, or alternatively into a second air port 314. Pistons 318, 320 serve as alternate direction drives depending on which port 310, 314 is used. An appropriate seal 322 is used on both piston drives 318, 320 to create an effective pneumatic seal behind the piston being driven. The pistons 318, 320 are attached to the travel member 300 through a longitudinal slot (not shown) formed into a flexible front wall of 323 of the rodless cylinder 90. The pistons 318, 320 are also connected to each other. Pneumatic air injected into the first port 310 pressurizes a volume 324 which causes a resultant force on the first piston 318 which moves the travel member 300 in a downward direction as shown in FIG. 4. Pneumatic air injected into the second port 314 pressurizes a second volume 326 which causes a resultant force on the second piston 320 which moves the travel member 300 in an upward direction as shown in FIG. 4.

Rodless cylinder drives as used in the present invention are known. The preferred embodiment of the present invention uses commercially available rodless cylinder drives such as an Origa series 2000, or a Lintra model, or a Tolomatic. Such rodless cylinder drives are also disclosed in U.S. Pat. No. 4,164,893 and U.S. Pat. No. 3,893,378.

A wrist pin 290 is provided to connect the driving frame 230 to the travel assembly 300 providing a flexible connection to allow for operational misalignments between the driving frame 230 and the travel member 300. The drive frame 230 is U-shaped with facing holes 231a, 231b to receive the wrist pin 290. The travel member 300 mounts to the wrist pin 290 between the facing holes 231a, 231b.

A vertical stop 340 is provided to prevent excessive upward vertical travel of the first tube 76. The vertical stop 340 comprises a threaded stud 342 engaged to a threaded lug 346 which is secured, such as by welding, to the back wall 246 of the housing 70. A cushioned stopper 344 is attached to the rod 342, the cushion stopper abutting the chassis 248 when the first tube 76 is at its furthest upward position. A lock nut 348 engages the threaded stud 342 and tightly abuts the threaded lug 346 to lock the vertical stop 340 in a selected position.

Figure 5:
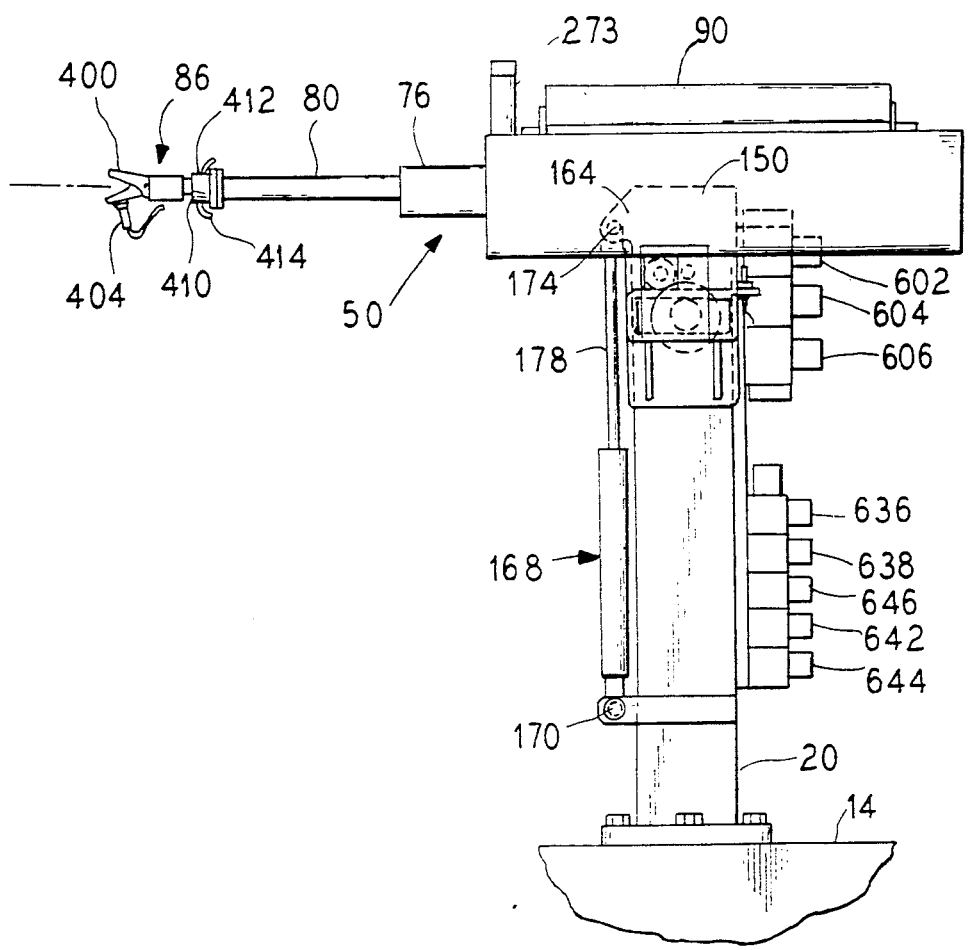
FIG. 5 is a side elevational view of the transfer robot with a robot arm assembly rotated 90° from its orientation shown in FIG. 1.

FIG. 5 shows the robot arm assembly rotated 90° to a horizontal orientation. The rotating actuator 168 is in a fully extended position with rod 178 extended upwardly to rotate the flange 150. The gripper assembly 86 is shown in more detail. A clamp 400 is shown in an open position for receiving the piece 18. A sensor 404 communicates a signal to the controller 60 that a piece has in fact been grasped. Adjacent to the clamp 400 is a rotation joint 410, pneumatic air input from tubes shown at 412, 414 will cause the clamp 400 to rotate clockwise or counterclockwise. A pneumatic tube to open or close the clamp 400 is not shown.

Figure 6:
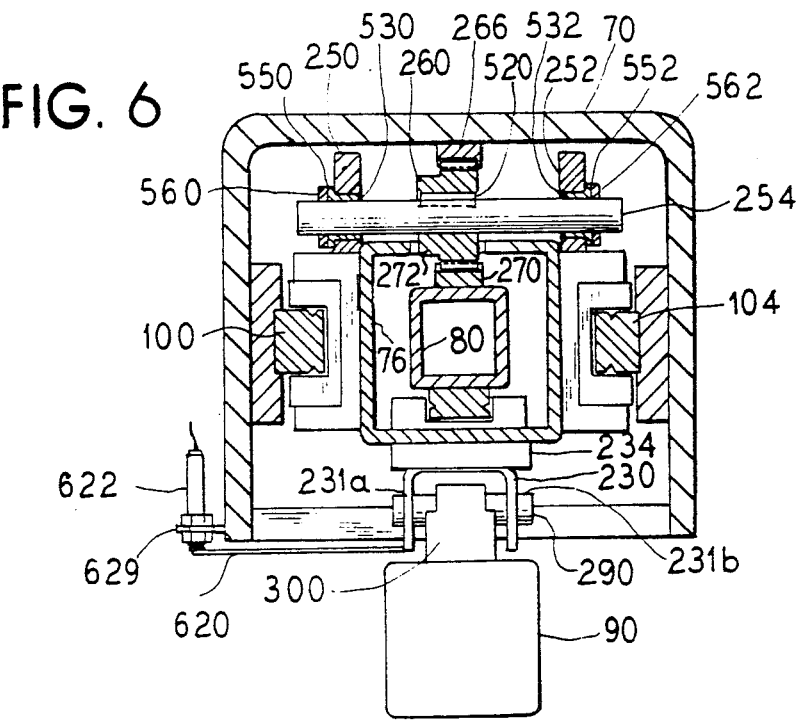
FIG. 6 is a sectional view generally along line VI—VI of FIG. 1.

FIG. 6 shows the pinion 260 engaged to the first rack 266 and the second rack 270. The pinion 260 engages the second rack 270 through a window 272 cut out of the first tube 76. The axle 254 is secured to the pinion 260 by a key 520, thus the pinion 260 and the axle 254 rotate together. The axle 254 is supported for rotation by the plates 250, 252. The plates 250, 252 provide aligned holes 530, 532 wherein reside bushings 550, 552 respectively. The bushings 550, 552 provide for smooth rotation of the axle 254 mounted therein. The axle 254 and bushings 550, 552 are held in place by outside end caps 560, 562 which are press fit onto the axle 254.

A system of sensing and controlling the various translations and rotations of the robot arm assembly 50 and the cantilever rack 40 is hereafter described. As shown in FIG. 4 the rodless cylinder drive provides air ports at 310, 314. Air ports 310, 314 are pneumatically connected to solenoid valves 602, 604, 606 shown mounted to the stand 20 in FIG. 5. The solenoid valves 602, 604, 606 provide various flow rates of pneumatic air to the selected port 310, 314 to allow for varying the upward or downward speed of the travel member 300. The controller 60 selects the appropriate one or combination of the solenoid valves 602, 604, 606 as well as the appropriate port 310, 314. A sensor bar 620 shown in Figure 1 and FIG. 6, is attached to the drive frame 230. The sensor bar 620 activates a signal from linear sensors 622, 624, 626 and 628 as the sensor bar moves linearly with the drive frame 230. The linear sensors 622, 624, 626, 628 are mounted on a sensor rail 629 (shown in FIG. 1) arranged parallel with the direction of travel of the drive frame 230. The linear sensors 622, 624, 626 and 628 send a signal to the controller 60 which can control the pneumatic output to the ports 310, 314 by selecting appropriate solenoid valves 602, 604 and 606. Thus the speed of the first tube 76 (and thusly the second tube 80) with respect to the housing 70 can be adjusted relative to a instantaneous extension of the robot arm assembly. Thus, the gripping assembly 86 can be slowed at critical positions to prevent jarring of the piece 18 or vibration of the robot arm caused by sudden stops or accelerations.

FIG. 5 shows solenoids 636, 638 and 640 mounted to the stand 20. The fourth solenoid 636 supplies pneumatic air to the clamp 400 to instigate closing. A spring (not shown) can be used to bias the clamp 400 to an open position. The fifth solenoid 638 directs pneumatic air to the port 412 of the rotation joint 410 for clockwise rotation, or to the port 414 of the rotation joint 410 for counter-clockwise rotation, of the clamp 400. The sixth solenoid 642 delivers pneumatic air to the first pneumatic actuator 130 for lateral translation of the robot arm assembly 50. The seventh solenoid 644 delivers pneumatic air to the second pneumatic actuator 168 to rotate the cantilever rack 40 for rotation of the robot arm assembly 50. An eighth solenoid 646 delivers pneumatic air to the lockout piston 273 to hold the robot arm assembly in a retracted position during inoperation.

The cantilever rack 40 has installed thereon a sensor track 650 whereon is mounted a lateral sensor 652 as shown in FIG. 1. The lateral sensor 652 sends a signal to the controller 60 to describe the lateral position of the robot arm assembly 50. Such lateral position can be used to control the first pneumatic actuator 130.

The second pneumatic actuator 168 provides location sensors 660, 662 which are actuated by an internal mechanism (not shown) to send a rotation position signal to the controller 60 whereupon the seventh solenoid 644 can be influenced to communicate with the rotation actuator 168.

Linear sensors 622, 624, 626, 628, lateral sensor 652, and location sensors 660, 662 can be a variety of known switches or electronic or mechanical devices. In the preferred embodiment these sensors are proximity switches.

Although other modifications and changes may be suggested by those skilled in the art, it is the intention of the inventor to embody within the patent warranted hereon all changes and modifications as reasonably and properly come within the scope of his contribution to the art.

The invention claimed is:

1. A transfer robot comprising:
   a stand mounted to a surface;
   a cantilever rack rotatably mounted to said stand;
   a robot arm assembly, for manipulating a workpiece, slidably mounted to said cantilever rack, moveable in a lateral direction along a longitudinal axis of said cantilever rack, said robot arm assembly having a length generally perpendicular to said axis of said cantilever rack, wherein said robot arm assembly comprises:
   a housing;
   a first tube mounted slidably within said housing, moveable in a linear direction parallel to a length of said housing, extendable outwardly of said housing;
   a second tube mounted slidably within said first tube, said second tube moveable linearly along an axis of said first tube, extendable outwardly of said first tube, said second tube providing at a remote end a gripping assembly for engaging said workpiece to be manipulated;

a rodless cylinder drive mounted to said housing and providing a linearly traveling member, said member secured to said first tube, said member providing motive force to move said first tube along said length of said housing;

a rack and pinion means engaged to said first and second tubes and said housing for imparting movement to said second tube along an axis of said second tube with respect to said first tube when said first tube is moved along said axis of said first tube with respect to said housing;

a first actuator mounted to said cantilever rack and secured to said robot arm assembly, said first actuator providing motive force to move said robot arm assembly laterally along said axis of said cantilever rack;

a second actuator mounted at one end to said stand and at another end to said cantilever rack actuation of said second actuator causing said cantilever rack to rotate about said axis of said rack with respect to said stand.

2. A transfer robot comprising:
a stand mounted to a surface;
a cantilever rack mounted to said stand;
a robot arm assembly, for manipulating a workpiece, slidably mounted to said cantilever rack, moveable in a lateral direction along a longitudinal axis of said cantilever rack, said robot arm assembly having a length generally perpendicular to said axis of said cantilever rack, wherein said robot arm assembly comprises:
 a housing;
 a first tube mounted slidably within said housing, moveable in a linear direction parallel to a length of said housing, extendable outwardly of said housing;
 a second tube mounted slidably within said first tube, said second tube moveable linearly along an axis of said first tube, extendable outwardly of said first tube, said second tube providing at a remote end a gripping assembly for engaging said workpiece to be manipulated;
 a rodless cylinder drive mounted to said housing and providing a linearly traveling member, said member secured to said first tube, said member providing motive force to move said first tube along said length of said housing;
 a double rack and pinion assembly engaged to said first and second tubes and said housing for imparting movement to said second tube with respect to said first tube, along said axis of said first tube when said first tube is moved with respect to said housing;
 a first actuator mounted to said cantilever rack and secured to said robot arm assembly, said first actuator providing motive force to move said robot arm assembly laterally along said axis of said cantilever rack.

3. A transfer robot as claimed in claim 2, wherein said double rack and pinion assembly comprises:
 a first rack secured to an inside wall of said housing and arranged parallel to said length of said housing;
 a second rack mounted to said second tube parallel to and facing said first rack;
 a chassis fixed to said first tube and arranged between said first tube and said back wall of said housing,
 a pinion mounted for rotation to said chassis, and engaging both said first rack and said second rack.

4. A transfer robot as claimed in claim 3, wherein said housing provides on opposite inside walls linear motion rails, said rails arranged parallel to said axis of said first tube;
 and said first tube provides a plurality of carriages fixedly mounted to said first tube and slidably mounted to said rails in a direction along said axis of said first tube.

5. A transfer robot as claimed in claim 4, wherein said second tube provides a third linear motion rail fixedly mounted to said second tube and arranged between said second tube and said first tube, said first tube providing a plurality of secondary carriages fixedly mounted to an inside surface of said first tube and slidably engaging said third linear motion rail.

6. A transfer robot as claimed in claim 5, wherein said gripping assembly comprises:
 a pneumatically actuated clamp for gripping said workpiece; and
 a pneumatically rotatable joint fixed to said remote end of said second tube, adjacent and fixed to said clamp, pneumatic actuation of said joint causing said clamp to rotate axially with respect to said second tube.

7. A transfer robot as claimed in claim 2, wherein said rodless cylinder drive further provides a signal bar, movable with said travelling member, and said housing provides mounted thereon a plurality of linear position sensors arranged along a line parallel to an axis of travel of said traveling member, said signal bar activating said sensors during travel; and said transfer robot further comprises:
 a controller receiving signals from said sensors;
 a plurality of pneumatic solenoid valves, supplied with outside pneumatic air, said solenoid valves having varied air flow capacity, said solenoid valves communicating with opposing air ports of said rodless cylinder drive, said controller acting to open and close selected solenoid valves depending on position of said traveling member as indicated by said sensors, said selected solenoid valves causing a corresponding selected speed and direction of said traveling member.

8. A transfer robot as claimed in claim 7, wherein said cantilever rack provides at least one lateral sensor activated by proximity to said robot arm assembly, said lateral sensor sending a signal to said controller.

9. A transfer robot as claimed in claim 1, further comprising a controller communicating with said second actuator, wherein said second actuator provides a first location sensor and a second location sensor, said first location sensor triggered by a first rotational position of said cantilever rack and said second location sensor triggered by a second rotational position of said cantilever rack, said first and second sensors sending signals to said controller, said controller sending selected instructions to said second actuator.

10. A transfer robot as claimed in claim 1, further comprising a controller, wherein said first actuator and said second actuator comprise pneumatic cylinder devices; and said transfer robot further comprises a plurality of secondary solenoid valves, communicating with said first and second actuators, said secondary solenoid valves selectively instructed by said controller to deliver outside pneumatic air to said first actuator and said second actuator.

11. A transfer robot as claimed in claim 2, wherein said housing further provides a lockout device, said lockout device mounted to said housing, and when activated projects a knob inwardly of said housing to abut a remote end of said first tube, thus preventing said first tube from projecting outwardly of said housing.

12. A transfer robot comprising:
a stand mounted to a surface;
a cantilever rack rotatably to said stand;
a robot arm assembly slidably mounted to said cantilever rack, moveable in a lateral direction along a longitudinal axis of said cantilever rack, said robot arm assembly having an axis generally perpendicular to said axis of said cantilever rack;
a first pneumatic actuator providing a threaded rod, said first pneumatic actuator mounted to a remote end of said cantilever rack, said threaded rod secured to said robot arm assembly, said first pneumatic actuator providing motive force to move said robot arm assembly laterally along said axis of said cantilever rack by extension and retraction of said threaded rod;
a second pneumatic actuator mounted at one end to said stand and at another end to said cantilever rack, at a lever arm connection offset from said axis of said cantilever rack, actuation of said second pneumatic actuator causing said cantilever rack to rotate about said axis of said cantilever rack with respect to said stand;
a rodless cylinder drive mounted to said robot arm assembly, said rodless cylinder drive providing motive force for extension and retraction of said robot arm assembly along said axis of said robot arm assembly;
a plurality of solenoid valves, supplied with outside pressurized air, and communicating with said first pneumatic actuator, said second pneumatic actuator and said rodless cylinder drive;
a plurality of position sensors, mounted to said cantilever rack, said robot arm assembly, and said second pneumatic actuator, said sensors describing lateral position, robot arm extension, and rotation position of said robot arm;
a controller receiving signals from said sensors, and outputting directions to said solenoid valves to coordinate movement and position of said robot arm assembly; and
a gripping assembly mounted to a remote end of said robot arm assembly, said gripping assembly selectively engagable to a workpiece.

13. A transfer robot as claimed in claim 12, wherein said cantilever rack comprises two linear motion rails and said robot arm assembly is slidably engaged to said two linear motion rails, providing lateral movement of said robot arm assembly along said axis of said cantilever rack.

14. A transfer robot as claimed in claim 12, wherein said robot arm assembly comprises:
a U-shaped housing;
a first tube mounted slidably within said housing, moveable in a linear direction parallel to a length of said housing, extendable outwardly of said housing;
a second tube mounted slidably within said first tube, said second tube movable linearly along an axis of said first tube, extendable outwardly of said first tube, said second tube mounting at a remote end said gripping assembly;
a rack and pinion means engaged to said first and second tubes and said housing for imparting movement to said second tube with respect to said first tube when said first tube is moved with respect to said housing;
and said rodless cylinder drive mounted to said housing, providing a traveling member communicating inwardly of said housing, said traveling member moveable in a direction parallel to said axis of said first tube, said traveling member engaged to said first tube, said traveling member imparting movement to said first tube with respect to said housing.

15. A transfer robot as claimed in claim 14, wherein said rack and pinion means comprises:
a first rack secured to a back wall of said housing and arranged parallel to said length of said housing;
a second rack mounted to said second tube parallel to and facing said first rack;
a chassis fixed to said first tube and arranged between said first tube and said back wall of said housing, said chassis providing an axle mounted rotatably thereon;
a pinion mounted on said axle, and engaging both said first rack and said second rack, said pinion communicating with said second rack through a window in said first tube.

16. A transfer robot as claimed in claim 15, wherein said housing provides on opposite side walls linear motion rails, said rails arranged parallel to said axis of said first tube;
and said first tube provides a plurality of carriages fixedly mounted to said first tube and slidably engaged to said rails, allowing movement in a direction along said axis of said first tube only;
and said second tube provides a third linear motion rail fixedly mounted to said second tube and arranged between said second tube and said first tube, said first tube providing a plurality of second carriages fixedly mounted to an inside surface of said first tube and slidably engaging said third linear motion rail, said third linear motion rail permitting secondary carriage movement along said axis of said third rail only.

17. A transfer robot as claimed in claim 16, wherein said gripping assembly comprises:
a pneumatically actuated clamp for gripping said workpiece;
a pneumatically rotatable joint fixed to said remote end of said second tube adjacent said clamp and fixed to said clamp, said joint providing first and second pneumatic air ports, introducing pneumatic air to said first port causing said clamp to rotate axially clockwise with respect to said tube, and introducing pneumatic air into said second port causing said clamp to rotate axially counter clockwise with respect to said second tube; and
a workpiece sensor mounted to said clamp and communicating the presence of a workpiece engaged to said clamp, to said controller.

18. A transfer robot as claimed in claim 17, wherein said transfer robot further comprises a pneumatic lockout device, and a secondary solenoid valve, said lockout device comprising a pneumatic cylinder with a protudeable knob, said pneumatic cylinder mounted to said housing, said protudeable knob facing inwardly of said housing, said lockout device receiving pneumatic air from said secondary solenoid valve, when said secondary solenoid valve is actuated by said controller, pneumatic air introduced into said pneumatic cylinder causing said protudeable knob to locate abutting a remote end of said first tube, preventing said first tube from extending outwardly of said housing.

19. A transfer robot as claimed in claim 18, wherein said transfer robot further comprises:
- a first mechanical stop mounted to said cantilever rack, between said stand and said robot arm assembly, said first mechanical stop limiting an approach distance of said robot arm assembly toward said stand;
- and a second mechanical stop mounted interior of said housing, facing a top of said chassis on a side opposite a direction of robot arm assembly extension, said second mechanical stop limiting retraction of said chassis, said second mechanical stop adjustably positioned.

20. A transfer robot as claimed in claim 19, wherein said cantilever rack comprises a sensor track for adjustably mounting said position sensors, said sensor track providing means to adjustably locate said sensors along a lateral path of robot arm assembly movement with respect to said cantilever rack; and
- said housing provides a sensor rail, said sensor rail providing a mounting guide aligned parallel to the movement of said traveling member, said sensor rail providing a slot therein to slidingly adjust position of said position sensors along the path of said traveling member.

21. A transfer robot as claimed in claim 1, wherein said rodless cylinder drive further provides a signal bar, movable with said traveling member, and said housing provides mounted thereon a plurality of linear position sensors arranged along a line parallel to an access or travel of said traveling member, said signal bar activating said sensors during travel;
- said cantilever rack further provides at least one lateral sensor activated by proximity to said robot arm assembly;
- said second actuator further provides a first location sensor and a second location sensor, said first location sensor triggered by a first rotational position of said cantilever rack and second location sensor triggered by a second rotational position of said cantilever rack; and
- said transfer robot further comprises:
  - a controller receiving signals from said linear position sensors, said lateral sensor, and said location sensors,
  - a plurality of pneumatic solenoid valves, supplied with outside pneumatic air, said solenoid valves having varied air flow capacity, said solenoid valves communicating with opposing airports of said rodless cylinder drive, said controller acting to open and close selected solenoid valves depending on the position of said traveling member as indicated by said sensors, said selected solenoid valves causing a corresponding selected speed and direction of said traveling member,
  - and said controller communicating instructions to said first and second actuators.

22. A robot arm assembly comprising:
- a housing;
- a first tube mounted slidably within said housing, moveable in a linear direction parallel to a length of said housing, extendable outwardly of said housing;
- a second tube mounted slidably within said first tube, said second tube moveable linearly along an axis of said first tube, extendable outwardly of said first tube, said second tube providing at a remote end a gripping assembly for engaging said workpiece to be manipulated;
- drive means mounted to said housing and engaging said first tube, for providing motive force to move said first tube along said length of said housing;
- a rack and pinion means engaged to said first and second tubes and said housing for imparting movement to said second tube along an axis of said second tube, said movement with respect to said first tube when said first tube is moved along said axis of said first tube with respect to said housing; wherein said rack and pinion means comprises:
  - a first rack secured to an inside wall of said housing and arranged parallel to said length of said housing;
  - a second rack mounted to said second tube parallel to and facing said first rack;
  - a chassis fixed to said first tube and arranged between said first tube and said inside of said housing,
  - a pinion mounted for rotation to said chassis, and engaging both said first rack and said second rack.

23. A transfer robot as claimed in claim 22, wherein said drive means comprises a rodless cylinder drive mounted to said housing and providing a linearly traveling member, said member secured to said first tube.

24. A transfer robot as claimed in claim 22, wherein said housing provides an opposite inside walls linear motion rials, said rails arranged parallel to said axis of said first tube;
- and said first tube provides a plurality of carriages fixedly mounted to said first tube and slidably mounted to said rails in a direction along said axis of said first tube.

25. A transfer robot as claimed in claim 22, wherein said second tube provides a linear motion rail fixedly mounted to said second tube and arranged between said second tube and said first tube, said first tube providing a plurality of secondary carriages fixedly mounted to an inside surface of said first tube and slidably engaging said linear motion rail.

26. A transfer robot as claimed in claim 22, wherein said drive means comprises a rodless cylinder drive mounted to said housing and providing a linearly traveling member, said member secured to said first tube;
- and said assembly provides a first linear motion rail and carriage means arranged between said housing and said first tube for slidably mounting said first tube within said housing, and a second linear motion rail and carriage means arranged between said first tube and said second tube for slidably mounting said second tube within said first tube.

27. A transfer robot as claimed in claim 22, wherein said chassis provides an axle mounted rotatably thereon; and
- said pinion is mounted on said axle, said pinion communicating with said second rack through a window formed in said first tube.

28. A transfer robot as claimed in claim 1, wherein said rodless cylinder drive further provides a signal bar, movable with said traveling member, and said housing provides mounted thereon a plurality of linear position sensors arranged along a line parallel to an axis of travel of said traveling member, said signal bar activating said sensors during travel; and said transfer robot further comprises:

a controller receiving signals from sensors;

a plurality of pneumatic solenoid valves, supplied with outside pneumatic air, said solenoid valves having varied air flow capacity, said solenoid valves communicating with opposing airports of said rodless cylinder drive, said controller acting to open and close selected solenoid valves depending on position of said traveling member as indicated by said sensors, said selected solenoid valves causing a corresponding selected speed and direction of said traveling member.

* * * * *